US010972458B1

(12) United States Patent
Gaeta et al.

(10) Patent No.: US 10,972,458 B1
(45) Date of Patent: Apr. 6, 2021

(54) METHODS AND SYSTEMS FOR AUTHENTICATION ASSISTANT

(71) Applicant: United Services Automobile Association (USAA), San Antonio, TX (US)

(72) Inventors: Michael Joseph Gaeta, San Antonio, TX (US); Sumita T. Jonak, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 245 days.

(21) Appl. No.: 16/030,987

(22) Filed: Jul. 10, 2018

Related U.S. Application Data (60) Provisional application No. 62/532,825, filed on Jul. 14, 2017.

(51) Int. Cl.
*H04L 29/00* (2006.01)
*H04L 29/06* (2006.01)
*G06F 21/32* (2013.01)

(52) U.S. Cl.
CPC .......... *H04L 63/0861* (2013.01); *G06F 21/32* (2013.01); *H04L 63/0876* (2013.01); *G06F 2221/2103* (2013.01); *G06F 2221/2113* (2013.01)

(58) Field of Classification Search
CPC .. H04L 63/0861; H04L 63/0876; G06F 21/32
USPC .......................................................... 726/7
See application file for complete search history.

(56) References Cited

U.S. PATENT DOCUMENTS

| 8,140,340 B2* | 3/2012 | Bhogal | G10L 17/00 704/273 |
| 8,230,231 B2* | 7/2012 | Freeman | G06F 21/31 380/44 |
| 2016/0248752 A1* | 8/2016 | Blinn | H04L 63/0838 |

OTHER PUBLICATIONS

Eijja Kaasinen, Matti Aaltonen, Juha Kolari, Suvi Melakiski, Timo Laakko/ Two approaches to bringing Internet services to WAP devices/ 2000/Computer Networks /pp. 231-246 (Year: 2000).*

* cited by examiner

*Primary Examiner* — Morshed Mehedi
*Assistant Examiner* — Michael D Anderson
(74) *Attorney, Agent, or Firm* — Fletcher Yoder, P.C.

(57) ABSTRACT

Disclosed herein are embodiments of systems, methods, and products comprises a server, which receives a request from a user's electronic client device. The server determines the authentication level of the request. If the authentication level satisfies a threshold, the server may route the request to a call center computing system; otherwise, the server authenticates the user based on the authentication level. Specifically, the server presents one or more security challenges corresponding to the authentication level and authorizes the user if the user correctly answers the security challenges. The server may receive a second request from the same user who has been authorized for the first authentication level. If the authentication level of the second request is higher, the server may present more security challenges on the second level; if the authentication level is lower, the server directly allows the access of the requested services.

19 Claims, 3 Drawing Sheets

METHODS AND SYSTEMS FOR AUTHENTICATION ASSISTANT

CROSS-REFERENCE TO RELATED APPLICATIONS

This application claims priority to U.S. Provisional Patent Application Ser. No. 62/532,825, entitled "Methods and Systems for Authentication Assistant," filed Jul. 14, 2017, which is hereby incorporated by reference in its entirety.

TECHNICAL FIELD

This application relates generally to methods and systems for authenticating a user based on authentication levels by an authentication assistant.

BACKGROUND

Before a user is authorized to access an account server, the user is usually required to input a username and password associated with the account. If the username and password are correct (e.g., consistent with credentials stored in a database), the user is authorized to log into the account. However, if the username or password is not correct, the user may have to go through an authentication process. For example, the user may be required to provide credentials by answering a set of security challenges for the purpose of authentication. Authentication is a process in which the credentials provided are compared to those on file in a database of authorized users' information on a local operating system or within an authentication server. If the credentials match, the process is completed and the user is authorized access. In existing and conventional authentication methods, the user is required to provide all the credentials required for the authentication, or the user is denied to access the account server.

These conventional methods and software solutions have created several shortcomings and a new set of challenges. For example, by disclosing all of the credentials, the user's confidential information (e.g., date of birth, Social Security number, last bill amount) may be subjected to cyber-attacks. In another example, the information may be exploited by social engineering attackers for fraud, which often involve some prior research or setup and the use of this information to establish legitimacy in the mind of a target. In addition, the conventional authentication methods do not consider the differences of the user's requests. Instead, no matter what information the user may request, the conventional authentication methods always require the user to provide all of the credentials. For example, the conventional authentication process may be the same for a user regardless of whether the user is trying to transfer $100 or $100,000 from his or her account.

When dealing with multi-tier authentications, conventional authentication methods do not provide a user-friendly experience. For instance, when using a multi-tier authentication method, some conventional authentication methods require the user to authenticate him/self in accordance with the most restricted authentication tier. This has created a negative user experience because users may have to provide multiple credentials (e.g., passwords, PIN, and the like) for actions that require a low-level authentication. For instance, conventional authentication methods always require the user to authenticate himself/herself as if the user is attempting to transfer $100,000 (e.g., most restricted authentication tier).

SUMMARY

For the aforementioned reasons, there is a need for a more efficient and secure anti-fraud system and method that would allow an authentication server to determine the authentication level based on the command of the user's request and require the user to provide an appropriate amount of credentials corresponding to the request's authentication level. In addition, when the user's request switches to a different authentication level, the authentication server may authenticate the user by requiring a new set of credentials corresponding to the new authentication level. Discussed herein are systems and methods for authenticating the user based on the authentication level of the user's request.

In one embodiment, a method comprises receiving, by a first server from an electronic client device, a first auditory request inputted by a user, the electronic client device being configured to receive auditory instructions and output auditory responses; identifying, by the first server, a first command corresponding to the first auditory request by at least one of parsing, natural language identification, and semantic analysis of the first auditory request; determining, by the first server, a first authentication level associated with the first auditory request based on the first command; retrieving, by the first server from a database associated with the user, a first security challenge corresponding to the first authentication level; in response to transmitting the first security challenge to the electronic client device, receiving, by the first server, an auditory input from the electronic client device; when the auditory input matches a first record in the database corresponding to the first authentication level, routing, by the first server, the first auditory request to a second server, the second server being configured to transmit, to the first server, a first response corresponding to the first auditory request received from the electronic client device; receiving, by the first server, a second auditory request from the electronic client device; identifying, by the first server, a second command corresponding to the second auditory request by at least one of parsing, natural language identification, and semantic analysis of the second auditory request; determining, by the first server, a second authentication level associated with the second auditory request based on the second command; when the second authentication level is more restricted than the first authentication level: retrieving, by the first server from the database, a second security challenge corresponding to the second authentication level; in response to transmitting the second security challenge to the electronic client device, receiving, by the first server, a non-auditory input from the electronic client device; and when the non-auditory input matches a second record in the database corresponding to the second authentication level, routing, by the first server, the second auditory request to a third server, wherein the third server is configured to transmit a second response corresponding to the second auditory request received via the electronic client device.

In another embodiment, a computer system comprises a first server, a second server, a third server, an electronic client device, the first server is in communication with the second server, the third servers, and the electronic client device, and configured to: receive, from the electronic client device, a first auditory request inputted by a user, the electronic client device being configured to receive auditory instructions and output auditory responses; identify a first command corresponding to the first auditory request by at least one of parsing, natural language identification, and semantic analysis of the first auditory request; determine a first authentication level associated with the first auditory request based on the first command; retrieve, from a database associated with the user, a first security challenge corresponding to the first authentication level; in response to transmitting the first security challenge to the electronic client device, receive an auditory input from the electronic client device; when the auditory input matches a first record in the database corresponding to the first authentication level, route the first auditory request to the second server, the second server being configured to transmit, to the first server, a first response corresponding to the first auditory request received from the electronic client device; receive a second auditory request from the electronic client device; identify a second command corresponding to the second auditory request by at least one of parsing, natural language identification, and semantic analysis of the second auditory request; determine a second authentication level associated with the second auditory request based on the second command; when the second authentication level is more restricted than the first authentication level: retrieve, from the database, a second security challenge corresponding to the second authentication level; in response to transmitting the second security challenge to the electronic client device, receive a non-auditory input from the electronic client device; and when the non-auditory input matches a second record in the database corresponding to the second authentication level, route the second auditory request to the third server, wherein the third server is configured to transmit a second response corresponding to the second auditory request received via the electronic client device.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Figure 1:
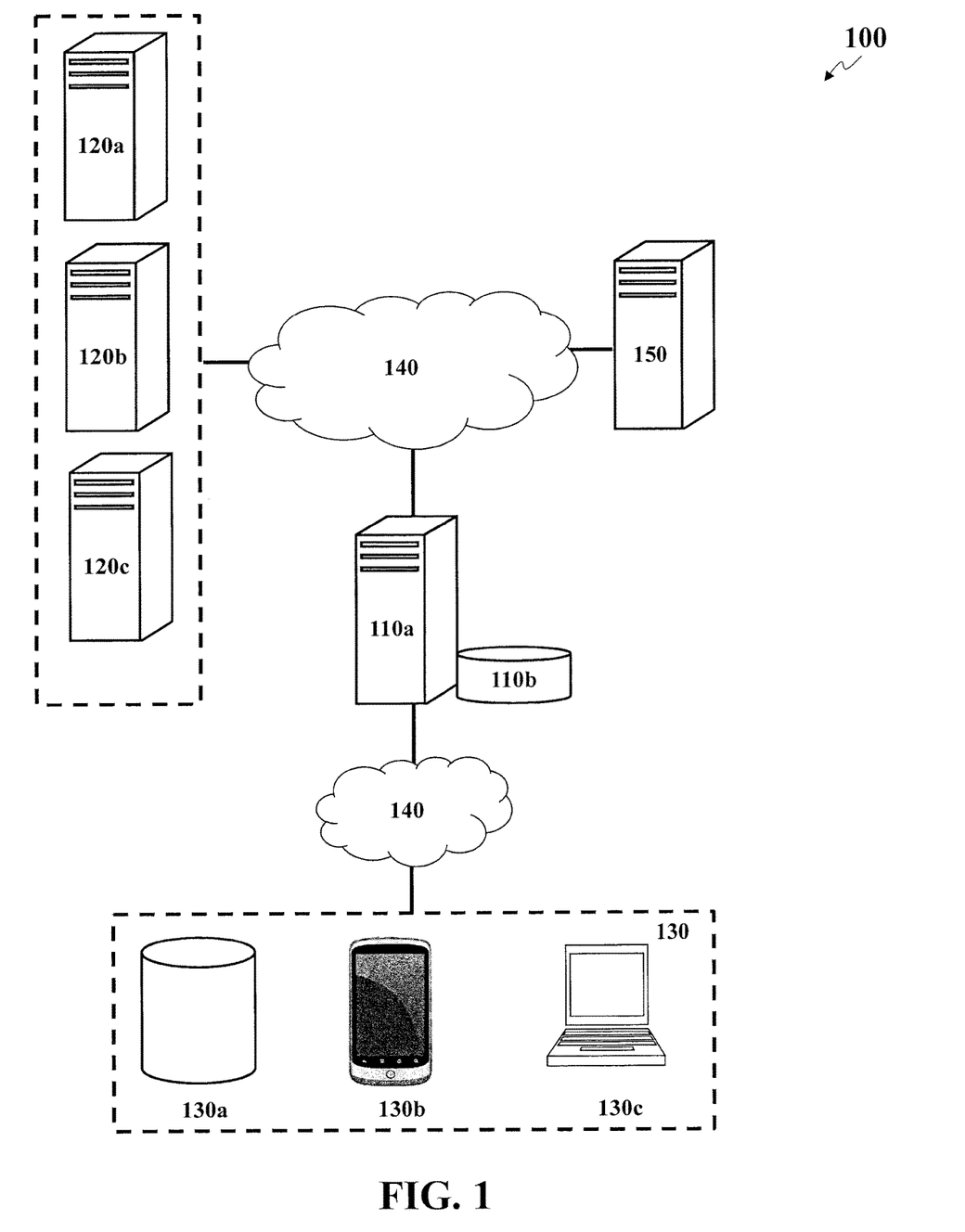
FIG. 1 illustrates a computer system for an authentication assistant, according to an embodiment.

FIG. 1 illustrates components of a system 100 for an authentication assistant, according to an embodiment. The system 100 may comprise an authentication server 110a, an authentication database 110b, an electronic client device 130, a call center computing system 150, and a set of account servers 120a, 120b, 120c. In operation, the authentication server 110a and the account server 120a, 120b, 120c may be one server with combined functionalities or two separate severs. The electronic client device 130 may be connected to the authentication server 110a via hardware and software components of one or more networks 140. Further, the authentication server 110a may be connected with the account server 120a, 120b, 120c and the call center computing system 150 via the network 140. Examples of the network 140 include, but are not limited to, Local Area Network (LAN), Wireless Local Area Network (WLAN), Metropolitan Area Network (MAN), Wide Area Network (WAN), and the Internet. The communication over the network 140 may be performed in accordance with various communication protocols, such as Transmission Control Protocol and Internet Protocol (TCP/IP), User Datagram Protocol (UDP), and IEEE communication protocols.

The electronic client device 130 may be any computing device allowing a participant/user to interact with authentication server 110a. The electronic client device 130 may be any computing device comprising of a processor and non-transitory machine-readable storage medium allowing the electronic client device 130 to perform the various tasks and processes described herein. The examples of the electronic client device may include, but are not limited to, a desktop computer, a laptop, a personal digital assistant (PDA), a smartphone or mobile phone, a tablet computer, and a voice-controlled speaker, which may execute an intelligent virtual assistant, e.g., a chatbot, Amazon Alexa/Echo, Google Home, and the like.

The electronic client device 130 may execute an Internet browser, local application, or otherwise an authentication protocol that accesses the authentication server 110a in order to issue requests or instructions and authenticate a user. The electronic client device 130 may transmit credentials from user inputs to the authentication server 110a, from which the authentication server 110a may authenticate the user and/or determine a user role. The electronic client device 130 may comprise any number of input devices configured to receive any number of data inputs, including various types of data inputs allowing for authentication (e.g., username, passwords, certificates, auditory instructions, and biometrics). For instance, the electronic device may include auditory input components configured to receive auditory inputs from the user.

The electronic client device 130 may be configured to communicate with the server 110a through one or more networks 140, using wired and/or wireless communication capabilities. In operation, the electronic client device 130 may execute an authentication assistant program, which may include a user interface that renders an interactive layout, schematic, or other elements for the user to input a request. For example, the user interface may include a text-based interface allowing the user to enter manual commands. Alternatively, the interface may include an audio-based interface allowing the user to speak to the electronic client device 130 and interact with the authentication server 110a. The authentication assistant program may be an application executing on the electronic client device.

An authentication server 110a may be any computing device comprising a processor and other computing hardware and software components, configured to process the requests received from the electronic client device 130. The authentication server 110a may be logically and physically organized within the same or different devices or structures, and may be distributed across any number of physical structures and locations (e.g., cabinets, rooms, buildings, and cities). The authentication server 110a may comprise, or may be in networked-communication with the authentication database 110b.

Upon the authentication server 110a receiving a request from the user, the authentication server 110a may execute one or more component software modules to decide the authentication level of the request based on the requested services. If the authentication level satisfies a threshold, the authentication server 110a may route the request to a call center computing system 150 through the network 140. For example, if the requested services include highly risky operations such as a large wire transfer from the account, the authentication server 110a may route the request to ask a member service representative to authenticate the user and process the request. By including human interference, the risk of the operation may be better controlled. For lower risk requests whose authentication level does not satisfy a threshold, the authentication server 110a may authenticate the user by presenting the user security challenges corresponding to the authentication level. Specifically, for an authentication level, the authentication server 110a may query the authentication database 110b to receive one or more security challenges corresponding to the authentication level. The authentication server 110a may display the queried security challenges on the electronic client device 130 for the user to answer. If the user answers the security challenges correctly, the authentication server 110a may grant the user authorization to access the account server 120a, 120b, 120c by routing the request to the account server 120a, 120b, 120c. Alternatively, if the authentication process fails, the authentication server 110a may route the request to the call center computing system 150.

An authentication database 110b may be any non-transitory machine-readable media configured to store authentication data. For example, the authentication database 110b may include the user identification, user credentials, a set of security challenges for each authentication level, answers to the security challenges, the personalized user preferences, authentication threshold value, and other related information. The authentication server 110a may generate the security challenges for each authentication level. Alternatively, the user may generate the security challenges for each authentication level based on the user's personal preferences. The user may answer the generated security challenges when setting up the account. The authentication server 110a may store the security challenges and the answers for each authentication level into the authentication database 110b. Furthermore, the user may set the authentication levels for specific requests. For example, the user may set the requests that involve making a transfer out of the account to have higher authentication levels.

The set of account servers 120a, 120b, 120c may be any computing device comprising a process and other computing hardware and software components, configured to store the account data and provide the requested services to the user once the authentication server 110a authorizes the user. Each account server 120a, 120b, 120c may be associated with a subject matter, and may be configured to respond to one or more instructions of their own subject matter. For example, one account server may be configured to fulfill banking services, one account server may be configured to fulfill insurance services, and another account server may be configured to fulfill investment services. In some configurations, different account servers may be configured to fulfill requests corresponding to different authentication levels. For instance, one account server may be configured to fulfill financial transfers for less than $5000 and another account server may be configured to fulfill money transfers Specifically, based on the subject matter of requested service, one of the account servers 120a, 120b, 120c may execute the requested operations, or search the requested information and transmit a response corresponding to the request to the electronic client device.

The call center computing system 150 may be a system configured to respond to highly risky requests that require human interactions. For example, if the authentication server 110a determines that the authentication level of a request satisfies a threshold, the authentication server 110a may route the request to the call center computing system 150. The calling center computing system 150 may have more resources to better understand the request and authenticate the user. For example, a member service representative from the call center computing system 150 may directly interact with the user to address any concerns or warnings associated with the requests before authorizing the user.

Figure 2:
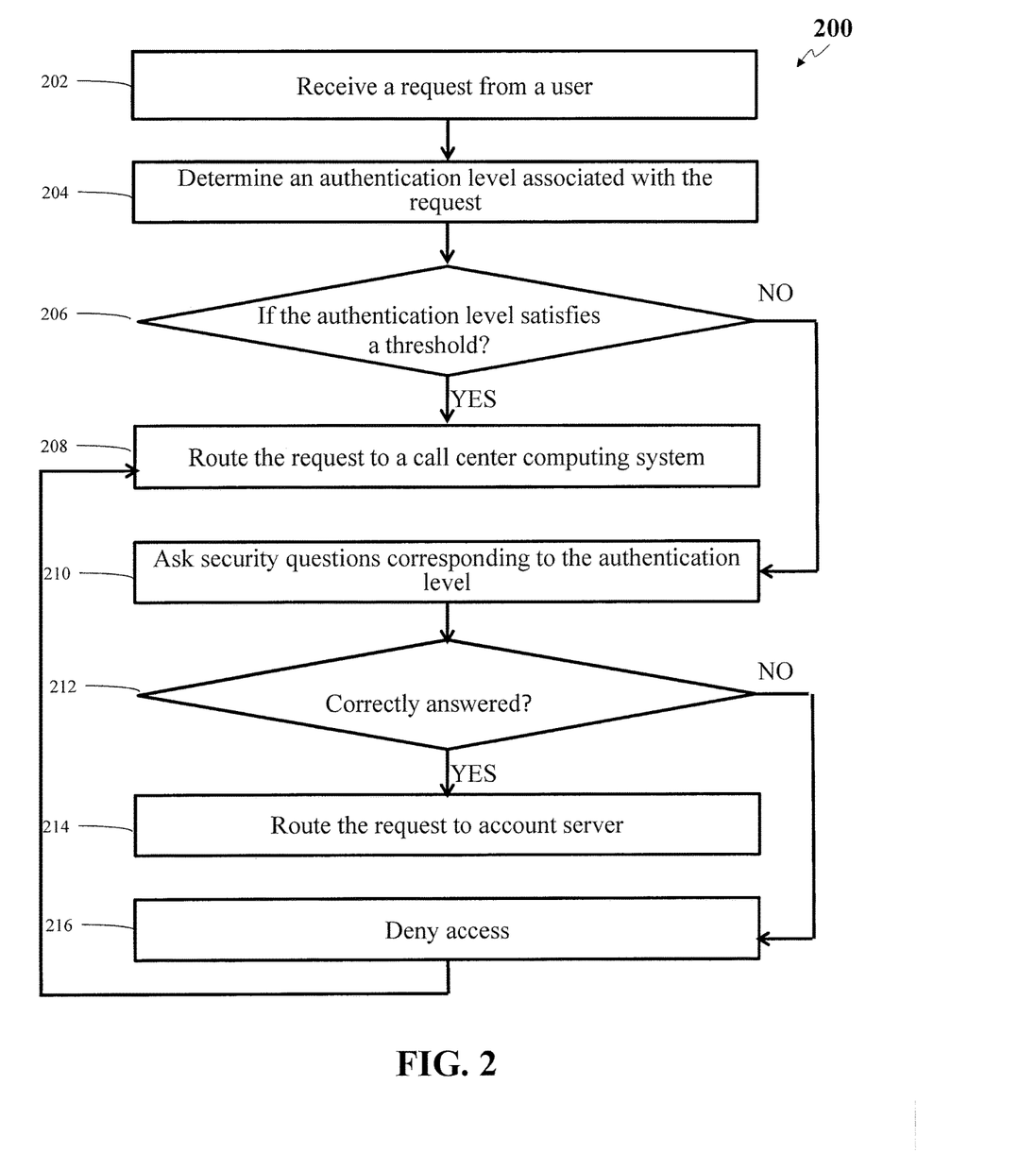
FIG. 2 illustrates a flowchart depicting operational steps for authenticating a user based on the authentication level of the user's request, according to an embodiment.

FIG. 2 illustrates execution of a method 200 for authenticating a user based on the authentication level of the user's request, according to an embodiment. One having ordinary skill in the art would appreciate that other embodiments may comprise additional or alternative steps, or may omit some steps altogether.

At step 202, the authentication server may receive a request from an electronic client device of a user. The request may be inputted by the user interacting with a chatbot. A chatbot (also known as a talkbot, chatterbot, bot, chatterbox, artificial conversational entity) can be a computer program that conducts a conversation with a user via auditory or textual methods on a user interface. For example, the authentication server may provide an authentication assistant computer program that acts as a chatbot. The user may interact with the authentication server through the chatbot.

In operation, the user may visit a website provided and generated by the analytic server in an Internet browser or a local application on a mobile device configured to receive a request from the user. The website or application may include a graphic user interface for the user to input a request. The user may input a request of different types or formats. For example, the request may be in the type of rich text or auditory input (e.g., WAV, MP3, WMA, AU, and the like), or image format (e.g. BMP, GIF, JPG, PNG, and the like) or any other format the user's electronic client device supports. The rich text format is a "common format" between otherwise incompatible word processing software and operating systems. There may be subtle differences between different versions of the rich text format specification. Nevertheless, the rich text format is consistent enough from computer to computer to be considered highly portable and acceptable for cross-platform use. The auditory input and image format request may not be computer readable. The authentication server may convert the request input into computer readable type by using speech recognition algorithms and character recognition algorithms. By supporting different types of request, the authentication server may be able to process requests from different channels of electronic client devices.

At step 204, the authentication server may determine an authentication level associated with the request. The user may request services that involve different levels of risk. The authentication server may categorize the requests into different authentication levels. If the request is in higher risk, the authentication server may conduct a higher level of authentication. In other words, the higher authentication level is more restricted and the authentication process is more cautious. For example, the authentication server may present more security challenges or ask questions that are more private and confidential.

In some embodiments, the authentication server may determine the authentication level based on the command corresponding to the request. Specifically, the authentication server may analyze the request by parsing the words, or using natural language identification or semantic analysis to identify the command corresponding to the request. The command may be the operations or activities on the account requested by the user. For example, the command may be a read operation that returns the account balance. Alternatively, the command may be a write operation that changes the balance of the account, such as making a transfer out of the account. The authentication server may have an authentication database that stores a list of known keywords of the commands and the corresponding authentication level. To identify the operations associated with the commands, the authentication server may parse the words of the computer readable request, and compare the parsed words to the list of keywords in the database. For example, the keywords may include "transfer," if the authentication server finds there is a match for the word "transfer," the authentication server may determine this command is a write operation that changes the balance of the account. Furthermore, the operation of making a transfer may be in different amounts. The authentication server may determine the amount by identifying the character "$" and the number following the character "$." The identified commands may be of different risk levels. For example, the command of read operation is in lower risk than the command of write operation. Additionally, the transferring operation in a smaller amount is in a lower risk than transferring a larger amount. The authentication server may further query the database for the authentication level of the identified command operations.

In some other embodiments, the authentication server may determine the authentication level based on the user's personal preferences including thresholds or parameters set by the user. For example, for one user, a transfer over $5000 may have the highest authentication level; for another user, a transfer over $500 may have the highest authentication level. The user may set up different thresholds or parameters for different operations based on the user's personal preferences. The authentication database may store such thresholds or parameters and the corresponding authentication level for a specific user. The authentication server may query the authentication database associated with the user based on the user identifier, and determine the authentication level of a request from the user by referring to the thresholds or parameters.

In some other embodiments, the authentication server may determine the authentication level based on the user's past requests. For example, the authentication server may study the user's request patterns based on the user's past requests by using machine learning algorithms. If a new request does not fit the user's patterns, the authentication server may determine the request is suspicious and the authentication level of this request is high. For example, the authentication server may receive a request for a large purchase of electronic products which the user has never purchased before. Or the request is for a purchase of electronic products with a much larger amount than usual. The authentication server may determine the request is of high authentication level.

At step 206, the authentication server may check if the authentication level satisfies a threshold. The threshold is a value used to determine if the authentication level is high enough to introduce human interference. If the authentication level satisfies the threshold, the process goes to step 208; otherwise, the process goes to step 210. The threshold may be a value configured by the authentication server based on the user's history of requests. The threshold may be a value initialized by the user based on personal preferences. Different requests may have different threshold values. Different users may have different threshold values.

At step 208, the authentication server may route the request to a call center computing system. The call center computing system may be comprised of member service representatives. As the authentication level satisfies the threshold, the request may be highly risky or suspicious. Thus, the authentication server may determine to introduce a member service representative to directly interface with the user and provide responses. The member service representative may have more resources to make accurate judgment of the request, and better serve the user. For example, the member service representative may directly call the user regarding the alerts or concerns associated with the request. The member service representative may further remind the user of potential fraud by providing related information and assistance. Once the member service representative determines the request is legitimate, the member service representative may transmit a response with the request services to electronic client device of the user. Alternatively, the member service representative may allow the user to access the account server, and the account server may provide the requested services to the user.

At step 210, the authentication server may present security challenges corresponding to the authentication level. The authentication server may design a set of security challenges for each authentication level. For a higher authentication level, the corresponding security challenges are more complicated with more private and confidential information. Alternatively, the user may design the security challenges by herself. The authentication database may store the security challenges and the answers. To authenticate a user with a request, the authentication server may query the authentication database for one or more security challenges. For example, the authentication server may randomly select one or more security challenges corresponding to the authentication level of the request. The authentication server may further display the queried security challenges on the electronic client device through the graphic user interface. The user may input answers to the security challenges on the graphic user interface.

At step 212, the authentication server may determine if the user has answered the security challenges correctly. For example, the authentication server may receive the input from the electronic client device, and compare the input from the user to the corresponding records stored in the authentication database. If the inputs match the records in the database, the process goes to step 214; otherwise the process goes to step 216.

At step 214, the authentication server may route the request to the account server. When the user has correctly answered the security challenges corresponding to the request, the authentication server may determine the user is an authorized user and allow the user to access the account server. The account server may conduct the necessary operations or searches corresponding to the command from the user and provide the requested services to the user by transmitting a response (e.g., an auditory response) to the electronic client device.

Instead of requesting the user's username and password in the conventional methods, the authentication server may analyze the request to determine an authentication level and present one or more security challenges. As a result, the authentication server may only allow the user to access a certain amount of the services for the specific authentication level. Comparing to the conventional methods that allow the user to do anything on the account once the username and passwords are correct, the methods described herein may improve the account security. On the other hand, the user may go through a simpler authentication that require less credentials for requests of lower authentication level instead of providing all of the credentials. Thus, the user experience is better. In addition, because the user does not need to provide all of the credentials every time going through the authentication process, the chance of the credentials being exploited by social engineers for fraud is decreased; thus, the authentication assistant described herein is anti-fraud.

At step 216, the authentication server may deny the access of requested service. If the user has not correctly answered the security challenges corresponding to the request, the authentication server may determine the user is an unauthorized user. To keep the account secure, the authentication server may deny the user the access of requested services. In addition, the authentication server may route the request to the call center computing system by going to step 208, where a member service representative may directly communicate with the user regarding the failed authentication. Moreover, the authentication server may conclude that the request may be from an attacker, and the authentication server may further generate an alert to notify the registered user regarding this failed request attempt.

Figure 3:
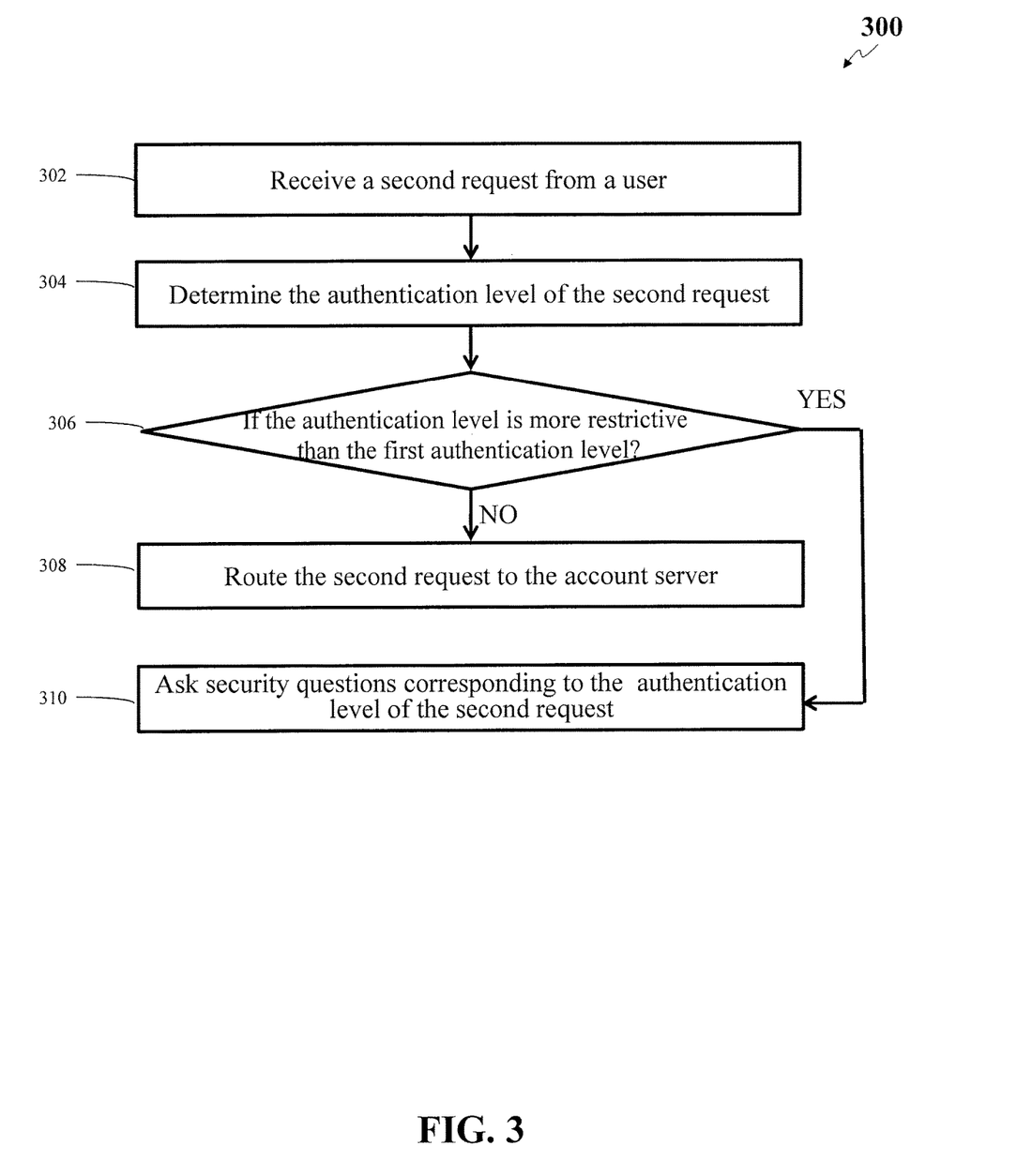
FIG. 3 illustrates a flowchart depicting operational steps for authenticating a user while switching the authentication levels, according to an embodiment.

FIG. 3 illustrates execution of a method 300 for authenticating a user while switching the authentication levels, according to an embodiment. One having ordinary skill in the art would appreciate that other embodiments may comprise additional or alternative steps, or may omit some steps altogether.

At step 302, the authentication server may receive a second request from the same user. In operation, the user may issue more than one request. For example, the user may request the account balance in the first request. After the user receives the response, the user may issue a second request for transferring $100 out of the account. As discussed above, the user may interact with the authentication server through a chatbot. The authentication server may display a graphic user interface on the electronic client device for the user to input the second request. The electronic device may be a desktop computer, a laptop, a personal digital assistant (PDA), a smartphone, a tablet computer, an intelligent assistant (e.g., Alexa) and the like. The second request may be in different types or formats. For example, the request may be in the type of rich text or auditory input or image format. The authentication server may convert the inputted request into computer readable format by using speech recognition algorithms and character recognition algorithms for future processing.

At step 304, the authentication server may determine the authentication level of the second request. As discussed above in step 204 of FIG. 2, in some embodiments, the authentication server may determine the authentication level of the second request based on the command corresponding to the request. In some other embodiments, the authentication server may determine the authentication level of the second request based on the user's personal preferences including thresholds or parameters set by the user. In some other embodiments, the authentication server may determine the authentication level of the second request based on the user's identification information and the electronic client device's identification information. In some other embodiments, the authentication server may determine the authentication level of the second request based on the user's past requests.

At step 306, the authentication server may determine if the authentication level of the second request is more restrictive than the authentication level of the first request. Assuming the authorized first request has a first authentication level. If the authentication level of the second request is more restrictive than the first level, the process goes to step 310; otherwise, the process goes to step 308. For instance, when the second request requires a more restricted authentication level, the authentication server may require the user to go through a second authentication process and then route the second request to the same or a different server (e.g., account server).

To improve the user experience, the user only needs to go through an authentication process that is corresponding to the authentication level of the request. For example, the user may go through a simpler authentication process for a less risky request. On the other hand, to protect the account security, the authentication server may only allow the user to access a limited amount of data and services based on the authentication level of the request. When a user issues requests in different authentication levels, the authentication server may authenticate the user by switching the authentication levels. Specifically, assuming the authentication server has authenticated the user for the first request with a first authentication level. If the user issued a second request by switching to a lower authentication level, the authentication server may authorize the user to access the account server, because the user has already went through a more rigorous authentication process for the first request. If the user switches to a higher authentication level, the authentication server may need to further authenticate the user for the higher level.

In step 308, the authentication server may route the second request to the account server. If the user switches to a lower authentication level from a higher authorized level, the authentication server may allow the user to access the account server without any authentication. The account server may directly route the request to the account server. The account server may provide the requested services to the user by transmitting a response (e.g., an auditory response) to the electronic client device.

In step 310, the authentication server may present one or more security challenges corresponding to the authentication level of the second request. Because the user switches to a more restricted authentication level (e.g., the user is requesting more restricted services that are not accessible for the current authorized level), the authentication server may need to further authorize the user for the second request. Specifically, the authentication server may query the authentication database for one or more security challenges corresponding to the more restricted authentication level of the second request. For example, the authentication server may randomly select one or more security challenges corresponding to the appropriate authentication level (chosen from the authentication database). The authentication server may display the selected security challenges on the electronic client device. The user may then enter a response to the security challenge via interacting with the electronic device (e.g., entering the response via keyboard or interacting with the display screen of the electronic client device). Based on whether the user has correctly answered the security challenges, the authentication server may determine whether to allow or deny the user access to the requested services for the second request.

In some configurations, the authentication server may transmit and display an authentication prompt on a second electronic client device. For instance, the authentication server may display an authentication prompt on a second electronic client device and request the user to input a response corresponding to the second security challenge. In a non-limiting example, the authentication server may receive the second request via the electronic client device (e.g., the user's tablet computer) and display an authentication prompt on the user's mobile device (e.g., mobile phone). The authentication server may retrieve a unique identifier (e.g., IP address, phone number, and/or MAC address) of the user's mobile device from a database and transmit the authentication prompt to the user's mobile device. In some configurations, the authentication server may transmit a push notification to an application executing on the user's mobile device. The prompt may comprise a security challenge (e.g., "enter your second level password") and a graphical input component/field. The user may then interact with the authentication prompt and input a response to the second security challenge.

The authentication server may also utilize a two-factor authentication method to receive the second input from the user. In a non-limiting example, the authentication server may transmit an electronic message (e.g., SMS, push notification, and the like) to the user's mobile device comprising a pre-determined passcode (e.g., alphanumerical string). The user may then be required to input (auditory or non-auditory) the passcode via the electronic client device (e.g., the user's tablet computer). For instance, the user may be required to read the passcode or type (or otherwise input) the passcode into the electronic client device.

In some configurations, the authentication server may activate a second electronic client device and use the second electronic device's existing authentication protocols to authenticate the user. For instance, the authentication server may instruct the user's mobile device to execute an authentication protocol without identifying an authentication prompt or a security challenge. The user's mobile device may then execute an authentication protocol independently from the authentication server. Upon receiving a notification that the user has successfully completed the mobile device's security protocol, the authentication server may route the second request to the account server.

In some embodiments, the authentication server may also use an identifier associated with the electronic client device as a second authentication factor to authenticate the user. For instance, the authentication server may query and retrieve an identifier associated with the electronic client device and use the identifier to authenticate the user into the second stage. In some embodiments, when the authentication server receives a request of a higher authentication level, the authentication server may query the global positioning system (GPS) data from the electronic client device and compare the GPS with the user's registered address. For example, the authentication server may determine that the user is a resident in United States of America (USA) based on the user's registered address. If the GPS data is in Europe, the authentication server may determine the authentication level of this request should be high enough to trigger an alert or include some human interference, and the authentication server may further route the request and the alert to the call center computing system.

As another example, when the authentication server receives a request of a higher authentication level, the authentication server may query the unique device identifier or Internet protocol (IP) address of the electronic client device. If the unique device identifier or IP address is not from the same device the user usually used to log in and issue requests, the authentication server may determine the authentication level is high and further trigger an alert and route the request to the call center computing system. For example, the authentication server may alert "the account was logged into from a computer, mobile device or other device the user has never used before." In addition, the authentication server may temporarily lock the account until a member service representative from the call center computing system reviews the account activity and solves the alert. One having ordinary skill in the art would also appreciate that the authentication server may query other network connection attributes from the electronic client device.

This authentication process for higher authentication levels may be a hierarchy method. For example, if the user requests to check the account balance, the authentication server may ask the personal identification number (PIN). If the user requests to transfer $100 out of the account, the authentication server may ask the maiden name of the use's mother. If the user requests to transfer $10,000 out of the account, the authentication server may ask the check number of most recent check the user has written, the amount and the purpose. If the user requests to transfer $50,000 out of the account, the authentication server may route the request to the call center computing system.

In some embodiments, the analytic server may switch the authentication levels based on the user's actions. For example, the analytic server may set a timeout threshold for the authentication status. If the user on the high authentication level has been inactive for more than 20 minutes, the analytic server may automatically log out the user. Alternatively, the analytic server may reduce the authentication status to a lower level. As a result, the analytic server may improve the account security.

In one example, a user is communicating with an electronic client device, such as a voice-controlled speaker configured to receive auditory instructions and play auditory responses to those instructions. The user desires to access an account, so the user speaks a command to the voice-controlled speaker to access a banking application. The voice-controlled speaker recognizes that a first level of authentication is needed and prompts the user to speak a password. Upon speaking the correct password, the user is given access. When the user asks to conduct a transaction using the account, the voice-controlled speaker may determine that a second level of authentication is needed and prompt the user for a second password. Upon speaking the correct password, the user is able to conduct that transaction.

In another example, a user is communicating with an electronic client device, such as a voice-controlled speaker configured to receive auditory instructions and play auditory responses to those instructions. The user desires to access an account, so the user speaks a command to the voice-controlled speaker to access a banking application. The voice-controlled speaker recognizes that a first level of authentication is needed and prompts the user to speak a password. Upon speaking the correct password, the user is given access. When the user asks to conduct a transaction using the account, the voice-controlled speaker may determine that a second level of authentication is needed and prompt the user for a second password is generated on different electronic client device, such as a mobile phone of the user. Upon inputting (e.g., speaking, typing, selecting, presenting) the correct password or credential to the mobile phone, the mobile phone transmits the input so that the user is able to conduct that transaction.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
receiving, by a first server from an electronic client device, a first auditory request inputted by a user, the electronic client device being configured to receive auditory instructions and output auditory responses;
identifying, by the first server, a first command corresponding to the first auditory request by at least one of parsing, natural language identification, and semantic analysis of the first auditory request;
determining, by the first server, a first authentication level associated with the first auditory request based on the first command;
retrieving, by the first server from a database associated with the user, a first security challenge corresponding to the first authentication level;
in response to transmitting the first security challenge to the electronic client device, receiving, by the first server, an auditory input from the electronic client device;
in response to determining that the auditory input matches a first record in the database corresponding to the first authentication level, routing, by the first server, the first auditory request to a second server, the second server being configured to transmit, to the first server, a first response corresponding to the first auditory request received from the electronic client device;

receiving, by the first server, a second auditory request from the electronic client device;

identifying, by the first server, a second command corresponding to the second auditory request by at least one of parsing, natural language identification, and semantic analysis of the second auditory request;

determining, by the first server, a second authentication level associated with the second auditory request based on the second command;

comparing a restrictedness between the first authentication level and the second authentication level; and in response to determining that the second authentication level is more restricted than the first authentication level:
retrieving, by the first server from the database, a second security challenge corresponding to the second authentication level;
in response to transmitting the second security challenge to the electronic client device, receiving, by the first server, a non-auditory input from the electronic client device; and
in response to determining that the non-auditory input matches a second record in the database corresponding to the second authentication level, routing, by the first server, the second auditory request to a third server, wherein the third server is configured to transmit a second response corresponding to the second auditory request received via the electronic client device.

2. The method of claim 1, further comprising:
in response to determining that the second authentication level satisfies a threshold, routing, by the first server, the second auditory request to a call center computing system.

3. The method of claim 1, further comprising:
in response to determining that the auditory input does not match records in the database, denying, by the first server, access of requested services of the first auditory request; and
in response to determining that the non-auditory input does not match records in the database, denying, by the first server, access of requested services of the second auditory request.

4. The method of claim 1, wherein the first server may determine the first authentication level and the second authentication level based upon thresholds set by the user.

5. The method of claim 1, further comprising:
in response to determining that the second authentication level is less restricted than the first authentication level:
routing, by the first server, the second auditory request to the second server, wherein the second server is configured to transmit the second response corresponding to the second auditory request to the electronic client device.

6. The method of claim 1, wherein the first and second auditory requests are received in response to the user interacting with a chatbot.

7. The method of claim 1, wherein the second and third servers are configured to receive requests in different subject matters.

8. The method of claim 1, further comprising:
querying a unique device identifier, or an Internet protocol (IP) address, or global positioning system (GPS) data, or network connection attributes from the electronic client device.

9. The method of claim 1, further comprising:
transforming, by the first server, the received request from the electronic client device into computer readable type for the first server.

10. The method of claim 1, wherein the first server queries the database to randomly select the first security challenge from a set of security challenges corresponding to the first authentication level and randomly select the second security challenge from a set of security challenges corresponding to second authentication level.

11. A computer system comprising:
a first server;
a second server;
a third server; and
an electronic client device, wherein the first server is in communication with the second server, the third server, and the electronic client device, and the first server is configured to:
receive, from the electronic client device, a first request inputted by a user;
identify a first command corresponding to the first request;
determine a first authentication level associated with the first request based on the first command;
retrieve, from a database associated with the user, a first security challenge corresponding to the first authentication level;
in response to transmitting the first security challenge to the electronic client device, receive a first input from the electronic client device;
in response to determining that the first input matches a first record in the database corresponding to the first authentication level, route the first request to the second server, the second server being configured to transmit, to the first server, a first response corresponding to the first request received from the electronic client device;
receive a second request from the electronic client device;
identify a second command corresponding to the second request;
determine a second authentication level associated with the second request based on the second command;
compare a restrictedness between the first authentication level and the second authentication level; and
in response to determining that the second authentication level is more restricted than the first authentication level:
retrieve, from the database, a second security challenge corresponding to the second authentication level;
in response to transmitting the second security challenge to the electronic client device, receive a second input from the electronic client device; and
in response to determining that the second input matches a second record in the database corresponding to the second authentication level, route the second auditory request to the third server, wherein the third server is configured to transmit a second response corresponding to the second auditory request received via the electronic client device.

12. The computer system of claim 11, wherein the first server is further configured to:

in response to determining that the second authentication level satisfies a threshold, route the second request to a call center computing system.

13. The computer system of claim 11, wherein the first server is further configured to:

in response to determining that the first input does not match the first record in the database, deny access of requested services of the first request; and in response to determining that the second input does not match the second record in the database, deny access of requested services of the second request.

14. The computer system of claim 11, wherein the first server is configured to determine the first authentication level and the second authentication level based upon thresholds set by the user.

15. The computer system of claim 11, wherein the first server is further configured to:

in response to determining that the second authentication level is less restricted than the first authentication level:

route the second request to the second server, wherein the second server is configured to transmit the second response corresponding to the second request to the electronic client device.

16. The computer system of claim 11, wherein the first and second requests are received in response to the user interacting with a chatbot.

17. The computer system of claim 11, wherein the second and third servers are configured to receive requests in different subject matters.

18. The computer system of claim 11, wherein the first server is further configured to:

query a unique device identifier, or an Internet protocol (IP) address, or global positioning system (GPS) data, or network connection attributes from the electronic client device.

19. The computer system of claim 11, wherein the first server queries the database to randomly select the first security challenge from a set of security challenges corresponding to the first authentication level and randomly select the second security challenge from a set of security challenges corresponding to second authentication level.

* * * * *